United States Patent [19]

Busby

[11] 4,254,409
[45] Mar. 3, 1981

[54] CONTROL SYSTEM FOR FULL LINE VARIABLE HEIGHT AND WIDTH CHARACTER AND SYMBOL PRINTING

[75] Inventor: James L. Busby, Mobile, Ala.

[73] Assignee: Quality Micro Systems, Inc., Mobile, Ala.

[21] Appl. No.: 970,028

[22] Filed: Dec. 15, 1978

[51] Int. Cl.³ ............................................. G06F 3/14
[52] U.S. Cl. .................................. 340/731; 340/723; 340/750; 178/30
[58] Field of Search ............... 340/723, 731, 748, 750; 178/15, 30; 400/124

[56] References Cited

U.S. PATENT DOCUMENTS

| | | | |
|---|---|---|---|
| 3,833,891 | 9/1974 | Howard et al. | 400/124 |
| 3,893,100 | 7/1975 | Stein . | |
| 3,895,375 | 7/1975 | Williams | 178/30 |
| 3,970,183 | 7/1976 | Robinson | 400/124 |
| 3,999,168 | 12/1976 | Findley et al. | 340/731 |
| 4,000,486 | 12/1976 | Schomburg | 178/30 |
| 4,007,442 | 2/1977 | Findley et al. | 178/30 |
| 4,068,224 | 1/1978 | Bechtle et al. | 178/30 |
| 4,097,873 | 6/1978 | Martin | 346/75 |
| 4,153,896 | 5/1979 | White | 340/731 |

Primary Examiner—Marshall M. Curtis
Attorney, Agent, or Firm—Jones, Tullar & Cooper

[57] ABSTRACT

A control system for modifying a conventional full width page printer to permit generation of different printed characters, symbols, or other graphic elements of different sizes in a single line. Use of this control system permits the sequential generation of such graphic elements, even though they have different relative widths and mixed sizes, during a single pass of the paper through the printer. In a block of printing which includes mixed sizes, the height of the highest character determines the printing unit, i.e., the block size, employed by this control system, and a variety of character sizes can be printed within that block. Vertical spacing between such blocks can be rapidly traversed by the printer to begin the next printing in any chosen format. Among the many capabilities of this control system is the printing of vertical words, words within larger letters, reverse printing, superscripts, subscripts, bar product codes, mixed sizes, and the like, all intermixed horizontally or vertically as desired without reversing the paper feed. By the use of two dimensional location of the beginning of each letter which is identified by control codes, minimal memory requirements are necessary.

24 Claims, 32 Drawing Figures

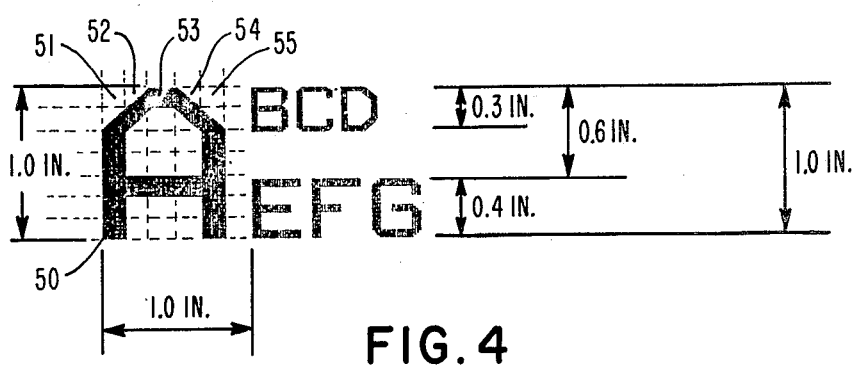
FIG. 4
FIG. 5
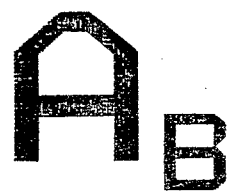
FIG. 6
FIG. 7
FIG. 8

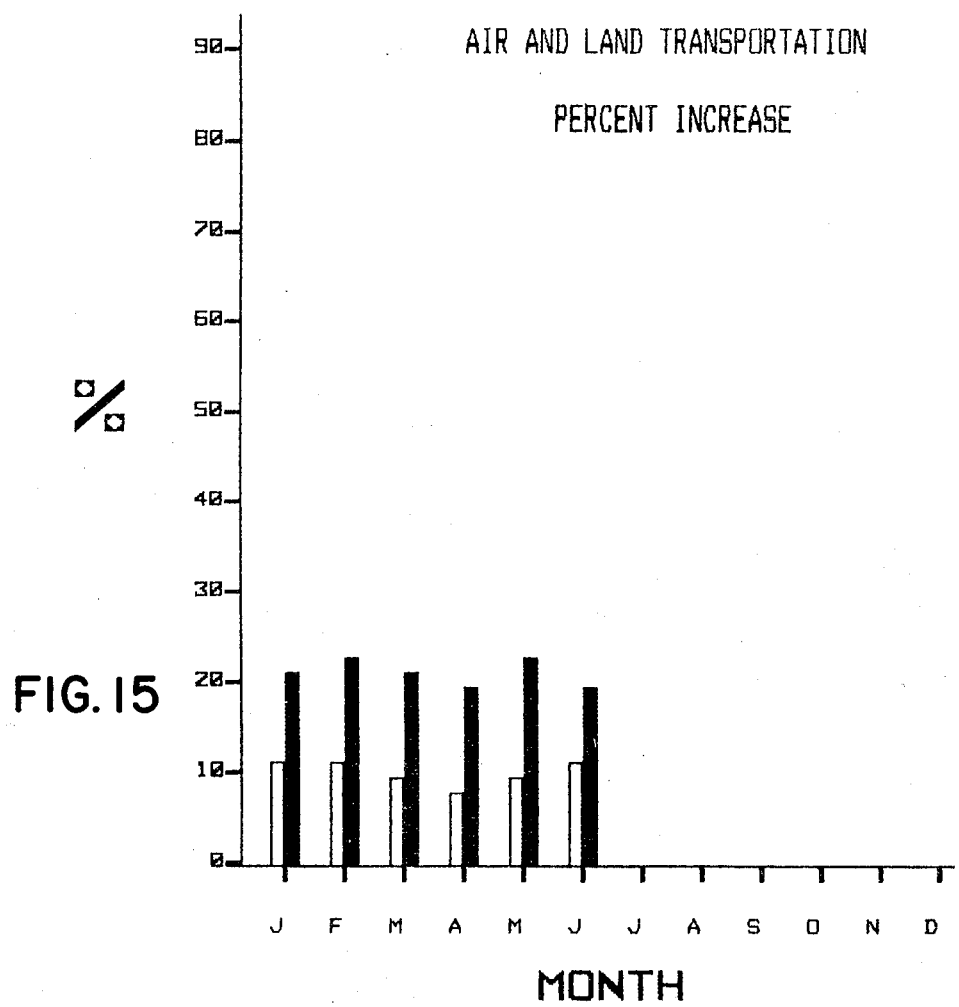

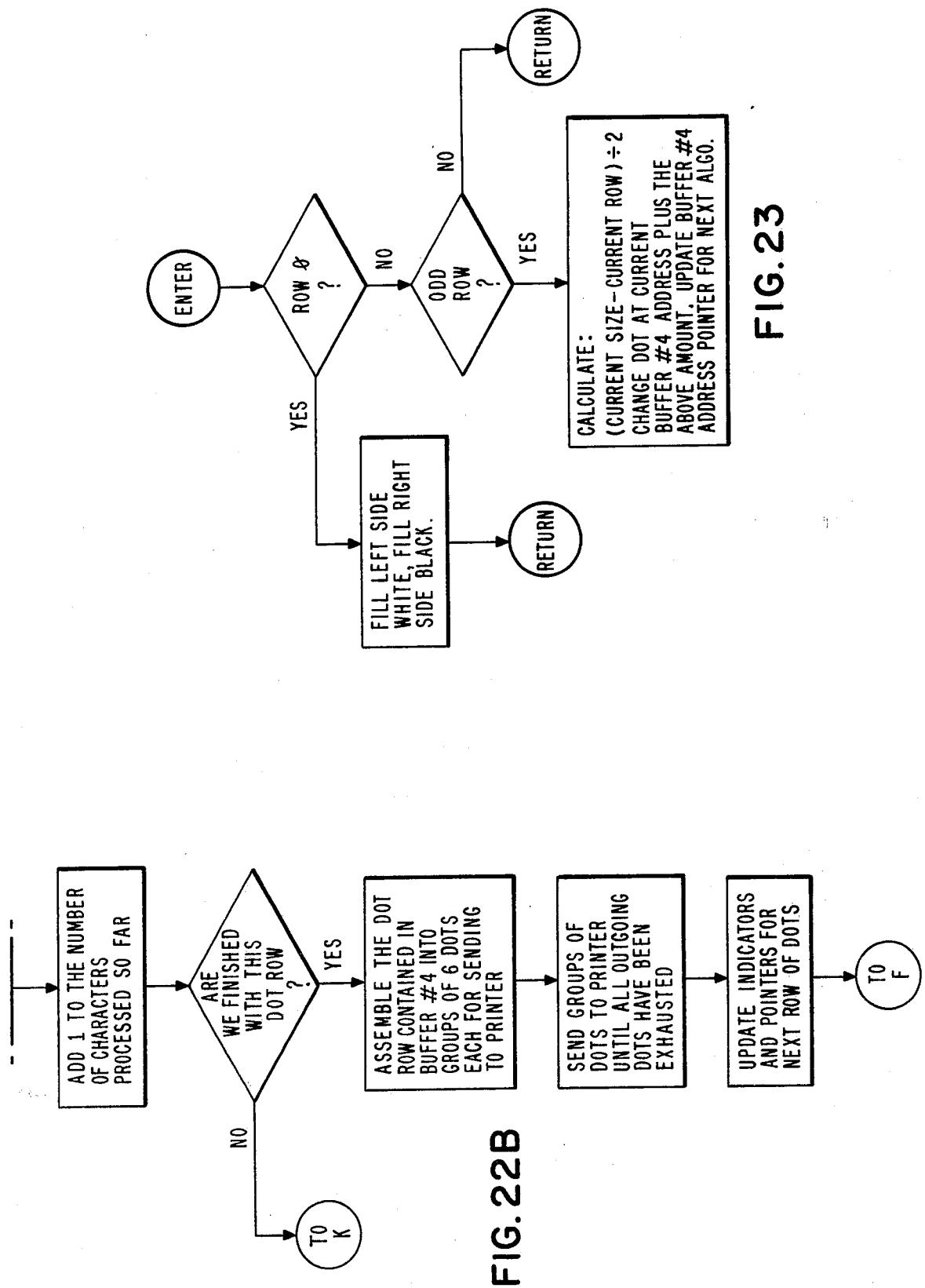

CONTROL SYSTEM FOR FULL LINE VARIABLE HEIGHT AND WIDTH CHARACTER AND SYMBOL PRINTING

FIELD OF THE INVENTION

This invention relates to the field of matrix printers and such devices wherein graphic elements, such as alpha-numeric characters, are generated by a computer controlled character forming device connected to a dot printer that prints an entire line at one time. More particularly, this invention relates to an improved control system for controlling the input to a conventional dot printer/plotter so as to produce variously sized and located graphic elements across a page with one pass of the paper through the printer.

BACKGROUND OF THE INVENTION

The generation of symbols for printing or display by selecting predetermined groups of dots from a set matrix or potential dots is a highly developed art. This technique has been used in various forms for cathode ray tube type computer output terminals, computer line printers and graphics quality photocomposers, and telegraphic printers, to mention a few examples.

The conventional dot printing mechanism normally operates in a single, fixed mode to produce alpha numeric characters of uniform height and selected shape. Earlier attempts at changing the fixed format to a more flexible arrangement which would permit printing of various character type fronts have been unduly limited in the variety of print size, choice of printed character, and flexibility made available; further, such variations often were found to be lacking in clarity of the printed elements. Such clarity is significant for aesthetic purposes and for ease of reading, but it was found to be even more important where such printers were used in the printing of product bar codes, and the like, where the clarity of the printing had to meet the requirements of optical readers. Prior systems for using dot printers were found to be inadequate both from the aesthetic point of view, and bcause they were not capable of accurate production of printed material such as bar codes. Further, the prior control devices caused the printers to operate at relatively slow speeds, and in order to produce differently sized characters beside each other, it was necessary to pass the page through the printer once for each individual size of character.

SUMMARY OF THE INVENTION

It is, therefore, an object of the present invention to provide a control system for a conventional dot printer that will permit a modification of its normal format to allow printing of characters, symbols, and other graphic elements of any desired size and combination at any location on a printed page in a single pass of the page through the printer.

Another object of the invention is the provision of a control system for a dot printer which will permit placement of any graphic element of any size at any location on the paper, including the placement of small alpha-numeric characters within a single larger character, the placement of such characters within graphic elements or designs such as boxes, or the like, without reversal of the paper drive mechanism.

A further object of the invention is the provision of a control system for a dot printer which operates the printer at maximum speed under both its normal modes of operation as well as under the modified mode provided by the present invention.

A further object of the invention is to provide a control system for a conventional dot printer which permits modification of its normal operation to provide printing of a variety of characters, symbols and other elements at selected locations on a page so that a wide variety of graphic displays may be printed on the page, including not only full page displays, but small, incremental, repetitive displays such as small labels and the like.

It is a further object of the invention to provide a control system which provides means for horizontal and vertical tabbing of graphic elements of various sizes so that these elements may be located in any selected location and in any mixture of sizes, with the relative locations of the elements being determined upon an element-by-element basis.

It is another object of the invention to provide control means for a conventional dot printer which provides reverse imaging of the graphic elements on an element-by-element basis.

Briefly, the foregoing and other objects of the invention are accomplished by means of a new and unique control circuit which operates in conjunction with a conventional dot printer/plotter to provide a selectable, controllable modification of the printer to enable it to operate not only in a standard print mode, but also in a slew mode and in a print modification mode. The standard mode permits the printer to operate in its normal manner as though the control circuit of the present invention were not present. The slew mode causes the printer to advance the paper rapidly without printing from the end of one print line to the desired location of the next print line. The print modification mode interposes the control circuit of the present invention into the control path of the printer to enable the printer to carry out the various objectives of the present invention and thus to print graphic displays of a style and design not previously possible with the printer.

The print modification mode for the printer is enabled by the control circuit of the present invention which includes means for receiving input control and data characters from a source such as a host computer or any other suitable source, and means for decoding such control characters. The system of the present invention further includes storage means for receiving a control program and further storage means for receiving selectable print codes which serve to activate predetermined portions of the printing mechanism in the dot counter to form predetermined patterns of printing, whereby selection of various print codes will produce corresponding graphic elements on the printer paper. The control system further includes means for utilizing the decoded input control characters to activate the stored program in such a way as to format the selected print codes, one print line at a time, into a printer interface buffer for storage. The print codes for this one print line are then sent to the printer, which is activated thereby to produce a single line of dots across the page, the available dots being present or absent on the page in accordance with the selected print code. The contents of the printer buffer are retained and the print codes for the next print line are selected. The new print codes are then supplied to the print buffer only where this next line of print requires a change in the previously stored codes and after this change, the next line of print is produced.

Through the use of the foregoing control circuitry, any available graphic display element may be selected and positioned as desired on the page, with the selected elements producing desired displays at the normal rate of speed of the printer, thereby greatly increasing the flexibility and usefulness of the conventional dot printer without destroying its ability to operate in a normal mode.

BRIEF DESCRIPTION OF THE DRAWINGS

The foregoing and additional objects, features and advantages of the present invention will be fully understood by those skilled in the art from the following detailed description of a preferred embodiment thereof, wherein reference is made to the accompanying drawings, in which:

FIGS. 4, 5, 6, 7, and 8 are illustrations of the character presentation capabilities of this invention;

FIG. 15 illustrates a capability of making graphs;

FIGS. 16, 17A, 17B, 17C, and 17D illustrate labeling capabilities of this invention;

FIGS. 18A, 18B, 18C, 19A, 19B, 19C, 20, 21, 22A, 22B and 22C illustrate logic flow utilized by this invention; and FIG. 23 shows a typical algorithm used to generate a specific printed symbol.

DESCRIPTION OF A PREFERRED EMBODIMENT

Figure 1:
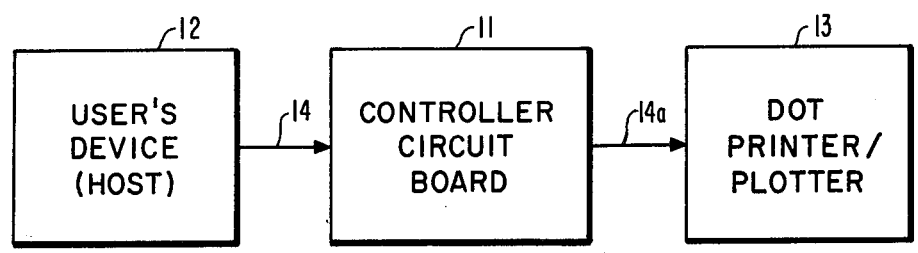
FIG. 1 is a block diagram illustrating the environment of this invention.
Figure 18C:
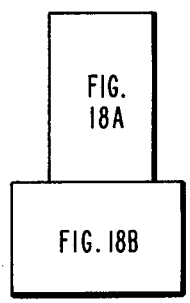
Figure 19C:
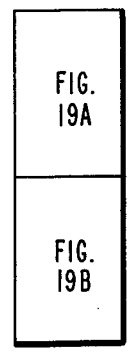

Turning now to the drawings, FIG. 1 shows the controller circuit board 11 of the present invention connected between a user's host computer 12 or other known suitable source of selectable control information, and a conventional dot printer/plotter 13, such as the Printronix Model-300 printer. Although described in terms of a specific application, it will be understood that the circuitry of this invention can be used with any such printer that has the capability of printing an entire line of dots simultaneously. The controller circuit board 11 comprises the entire modification of the system and, in the case of the Printronix-300 Printer, the system of this invention may be installed by slipping a single circuit card into a spare circuit card connector slot among the normal printed circuit boards, and utilizing the printer's existing power source. All of the capabilities of the printer existing before the insertion of the circuit card 11 remain available and unaltered. However, many valuable capabilities are added to the printer by this invention.

Conventional dot printers of the type herein referred to are designed to print a single line of closely spaced dots across the entire width of a page, with the printer including suitable electrical or mechanical means for individually operating each dot printer. Typically, 792 dots are provided across the width of a page and form a line, with the printer being capable of producing 40 lines per second. Between each line print, the selector for each dot is controlled to determine whether that particular dot is to be formed on a particular line and by regulating the printing of the dots, the desired graphical representation is produced on the paper. In the conventional printer, alpha-numeric characters are formed by selectively activating dots in a 5×7 or in a 4×6 matrix, each alpha-numeric character being printed by selecting, one line at a time, those dots within the matrix which are required to form the selected character.

In accordance with the present invention, the control circuitry of a standard printer is modified by the addition of controller circuit board 11 which is operative to produce a totally new function for the printer, enabling the printer to generate alpha-numeric characters of a variety of sizes and at selected locations, as well as enabling the printing of various symbols, designs and other graphic displays in selected, intermixed locations with selectable relationships between the various graphic elements. All of these elements may be produced by selecting appropriate dot printers one line at a time and advancing the printer page at the rate of 40 lines per second in the usual manner, the control of the printing operation permitting a variety of graphic elements to be produced in a single pass of the page to the printer.

With this invention, the printer is able, in the print modification mode, to print any size character, or graphic element, from one that is 0.1 inch high to one that is 12.7 inches in height, the choice of size being in increments of one tenth of an inch. Intermixing of different size characters on the same line in a single pass of the print mechanism without reversing such print mechanism is a prime capability. Since this invention does not interfere with the standard mode of operation of the printer, the printer can be used as a conventional line printer or a label printer without modification.

This device interfaces with computers from all major computer manufacturers, and may be operated thereby with relative ease, since only three control or data characters are required to shift the system to the print modification mode and to cause the control circuit of the invention to produce modified printed graphic elements. When no printing is required, and a large unprinted space is to appear on the printed page below the last printing, the system can easily be shifted to a slew mode, wherein paper can be fed at high speed to the next desired line of print, up to 25 inches, with no mechanical vertical format unit; that is, with only the normal mechanism of the printer.

The present system also provides self-testing, which is accomplished by the generation of a ripple test pattern, for example, while the printer is either on or off line. This is done by simply flipping a switch. Maximum print and feed rates of the printer are maintained since this device does not inhibit the speed of the printer.

Figure 2:
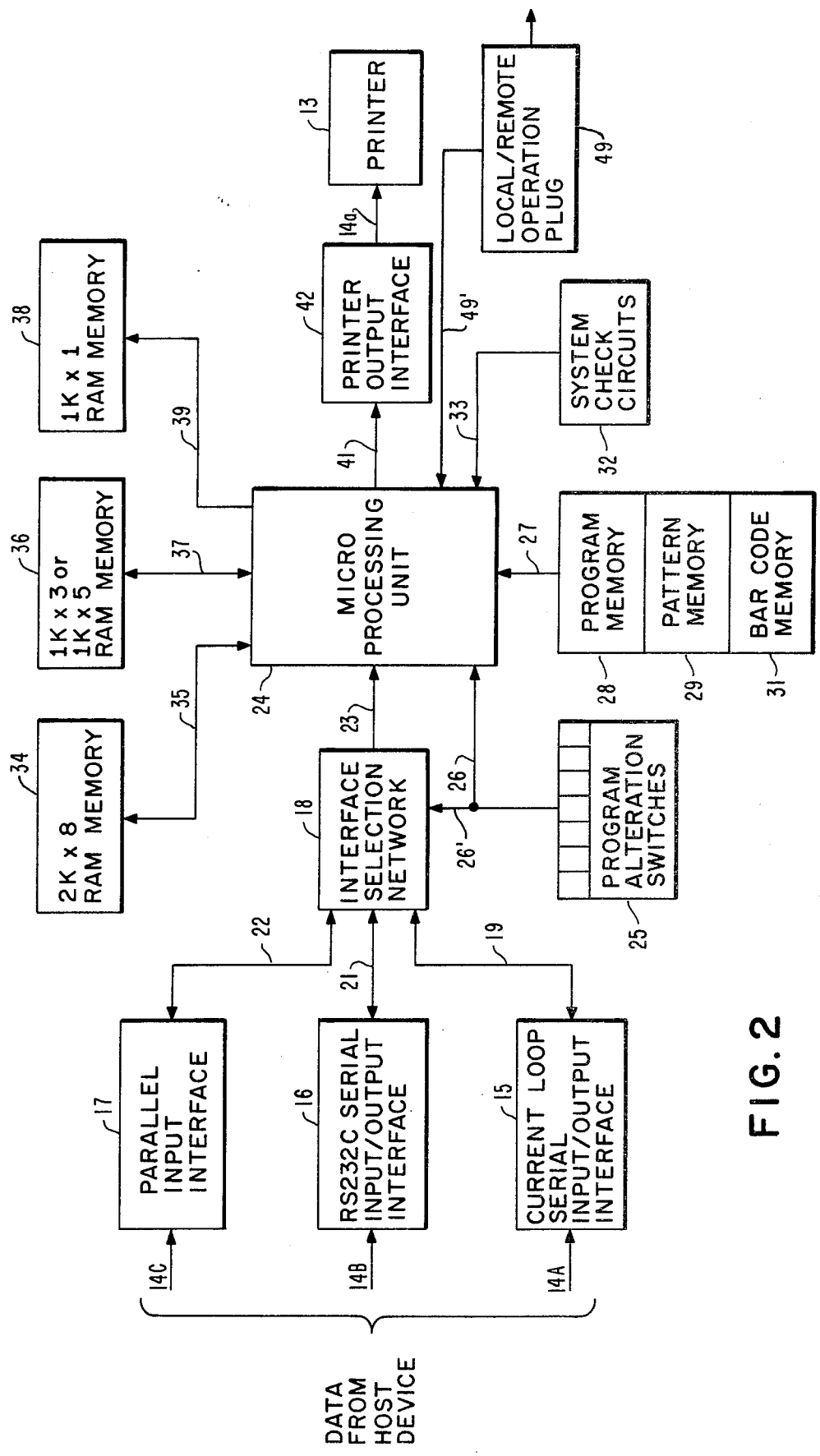
FIG. 2 is a block diagram of the hardware contained on the circuit board of this invention.

FIG. 2 is a block diagram of the control circuitry of the invention, shown in FIG. 1 as occupying a single circuit board 11. As seen in FIG. 1, the controller circuit board 11 is inserted between a computer 12 and a dot printer/plotter 13. The output of the computer is fed through connector 14 to the circuit board 11, and the output of the circuit board is connected to the printer/plotter 13 through connector cable 14a.

Returning now to FIG. 2, input from the computer to the circuit board 11 can take a plurality of forms. A current loop serial input/output interface 15, a modem input/output interface 16, and a parallel input interface 17 are included to illustrate the accommodation of various inputs. These interface circuits, which are shown as being connected to input lines 14A, 14B, and 14C, respectively, provide the required connection capabilities to enable the circuit of the present invention to receive inputs from a variety of sources. An interface selection network 18 is connected to the serial input 15 through connector 19. Modem interface 16 is connected through connector 21 to the interface selection network 18. The parallel input interface 17 is connected to interface selection network 18 through connector 22. A connector 23 connects the interface selection network 18 to a high speed microprocessing unit 24 which, in a preferred form of the invention, is a Motorola Model 68 B00 microprocessing unit. A plurality of program alteration switches 25 are connected through connector 26 to the processor 24 and through connector 26' to the selection network 18. Program alteration switches 25 are included for the purpose of changing the operation of the system from parallel to serial or vice-versa. Other program alteration switches are used to allow the user to set up the operating characteristics of the selected interface. For example, such other switches may control the number of data bits per control character, odd or even parity, etc.

Connected through connector 27 to the processor 24 are a random access program memory 28, hereinafter called RAM, a read only memory, ROM, character pattern memory 29, and a programmable read only memory, PROM, bar code memory 31. Also included are system check circuits 32 connected to the processor 34 through conductor 33. System check circuits 32 are utilized to check out all the components of the system. One of the conventional checks is to introduce a printing routine of the alphabet beginning with the letter "A" in the first row of printed characters and beginning with the letter "B" in the second row directly under the "A", "C" in the third row and so on as to produce diagonals and other effects wherein certain patterns are discernable for system checking.

A "scratch-pad" RAM 34 is connected through connector 35 to the processor 24. A pattern RAM 36 is connected through connector 37 to processor 24, and a 2 state dot buffer RAM 38 is connected through connector 39 to processor 24. A connector 41 connects the output of processor 24 to a printer output interface 42, the output of which is connected through connector 15 to the printer 13, as also shown in FIG. 1.

It is a feature of this invention to provide for external operation of the device by bypassing the microprocessing unit 24 with a local/remote operation plug 49 which may be connected into the circuit board 11 by way of a cable 49' and which is, in turn, connected to an external computer system. The external system then provides all the functions of unit 24, in conjunction with the various memory and other elements shown in FIG. 2. Inserton of a "local" plug allows local operation via the microprocessing unit. Insertion of a "remote" plug allows operation of the invention via a remote station. This feature greatly enhances the ability of this device to be customized to various operations, and to allow rapid repair of the device in the event of failure.

Figure 3:
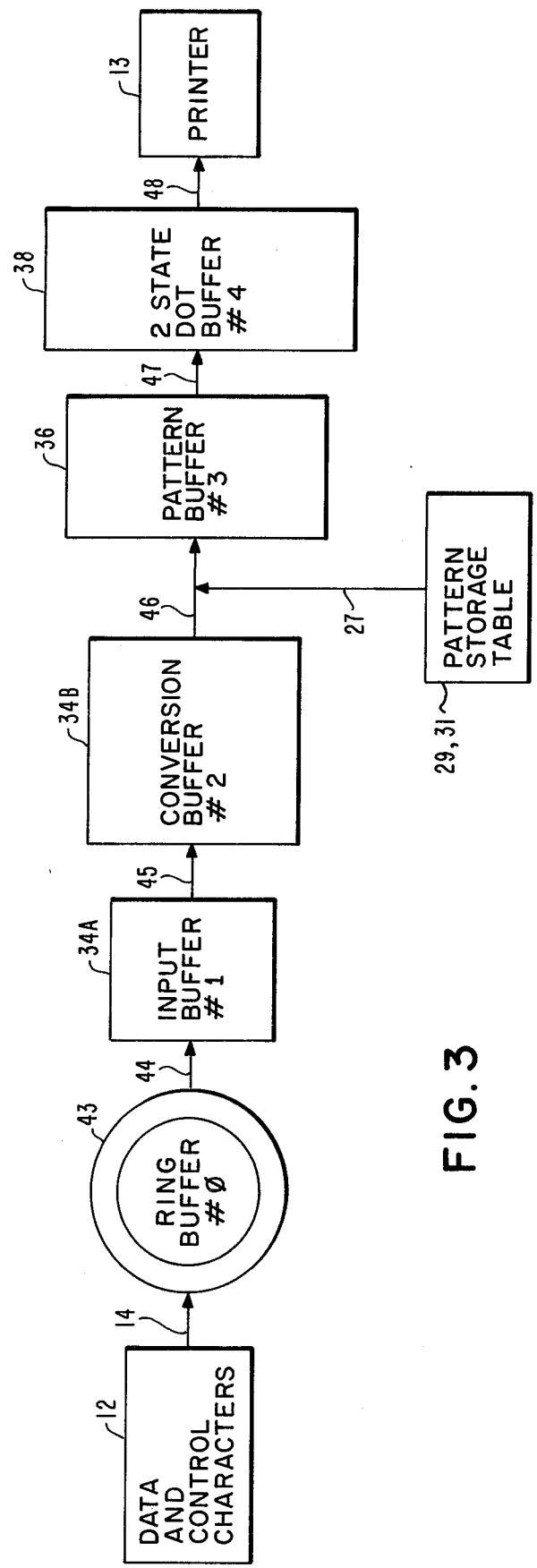
FIG. 3 is a block diagram of the data flow through the circuitry of this invention.

FIG. 3 illustrates the data flow function of the control system of the invention as shown in FIG. 2. As illustrated, the control system of the invention accepts a stream of information in the form of data and control characters which may be produced by the host computer 12 and transmitted to the circuit board 11 through connector 14. The input data characters are coded signals which identify data display elements which are to be printed on a sheet of paper as it passes through the controlled printer, while the input control characters are coded signals which are operative to cause the control system of the present invention to function in the manner specified by the coded information to act upon the data characters and to produce the desired printing operations. These input coded signals are selected by the system user to cause the control system of the present invention to produce printed displays in the form of letters, numbers and arbitrary designs of various sizes and locations whereby the printer will produce graphic displays of desired information in the specified manner. Where it is desired to have the printer operate in its normal and conventional manner, it is only necessary that the information supplied by the input device 12 contain the usual data and control information, without specifying the print modification mode which calls into operation the control system of the present invention. When this is done, the system operates in the standard, or normal, mode and produces letters, numbers, and the like in conventional manner. However, where the input information specifies that the system is to operate in the print modification mode, the control system is activated to thereafter modify the received data and control characters, or input signals, to produce selected modifications of the normal printed material, with these modifications including the features which have been described above. The coded control characters may also indicate a third mode of operation, where the printer is instructed to proceed directly to the next line to be printed, and this operation is defined as the slew mode.

The input coded signals which comprise the data and control characters are supplied through the appropriate interface networks such as those illustrated at 15, 16 and 17 in FIG. 2, which permit the present control system to be connected selectively to a variety of control sources. The input signals are supplied to an input means such as a ring buffer 43 which accommodates the system to random delivery of input information from a plurality of sources and retains such information until the processing unit 24 (FIG. 2) is ready to operate thereon. Under the control of the program in program memory 28, the processor 24 moves the new information from ring buffer 43 through logic connector 44 to input buffer No. 1, which occupies a portion of scratch pad RAM 34. Obviously, an individual RAM could be utilized for the input buffer No. 1.

The input stream of coded signals received from source 12 and supplied to the circuit of the present invention consists of a series of incoming coded characters which supply data and control information. Each series of characters provides information required for an operation by the control system and the printer, and each series is terminated by a line feed or carriage return character. The first data character following any line feed or carriage return character determines whether the next following signals are to be sent directly to the printer or are to be operated upon by the controller circuit board 11 of the present invention; that is, this first code character in a series is used to determine the mode of operation for the printer. If this first coded information character designates that no modification of the printed graphics is desired, the device will pass the incoming stream directly through to the printer in a "straight through" or normal mode.

On the other hand, when the first character in the input stream indicates that modification of the printer output is desired, the controller 11 assumes one of two modes. If the fourth coded input character in the received series is a line feed designation, the slew mode is selected, in which case the second coded character in such input stream designates the desired number of lines to be slewed. In response to such signals, the controller 11 causes the printer to slew the requested number of lines at the maximum slew rate for the printer. In the case of the Printronix 300 dot printer, the maximum slew rate is 8 inches per second. Immediately following a slew operation, the controller processes the next input stream, which has been stored in ring buffer 43 and is now moved to input buffer No. 1, indicated at 34A in FIG. 3, to determine the operation specified thereby.

The second mode that can be assumed by the controller 11, when the first coded character in the input stream indicates that modification of the printer output is desired, will be the print modification mode if the fourth coded character in the stream is something other than a line feed indicator. The print modification mode indicates that a graphic element or display is to be modified, and the controller begins to process the input data stream in the input buffer No. 1 to carry out this procedure. The printing action during the print modification mode, including the line-by-line motion of the paper and the formation of graphic elements and displays thereon is defined as a "pass". The total number of characters which may be printed in a single pass is limited only by the size of the RAM buffer allocated for that purpose.

The second coded character in the input stream during a print modification pass mode defines the size of the graphic element to be printed, and thus specifies the vertical height thereof. Because each printer operates in a certain matrix format, selection of a vertical height for a graphic element will automatically provide a corresponding horizontal width for the element to be printed. By way of example, the Printronix 300 printer mentioned above has a vertical printing density of 72 dots per inch. If the incremental sizes of the graphic display elements are chosen to be in approximately tenths of an inch, then there will be 7 dot lines in height for each size specified. This means that the smallest printed graphic element, such as a letter or number, will be about 0.09722 inch high, and for convenience this will be referred to as 0.1 inch. Thus, when a 5×7 matrix is selected for the basic printed element, then an enlargement of three would mean that a printed letter would occupy the space required for 21 lines of dots in its height, and 15 columns of dots in its width. Similarly, an enlargement of seven would require 49 dot lines for height and 35 dot columns for width, using the same basic 5×7 matrix. Other height options and basic matrix sizes are available for this and other printers. Thus, in the above example, if the second input coded character of the input stream is encoded as an octal 3, when a 5×7 matrix is used as the basic element, the height of a printed letter or number would be modified by the present invention, departing from the basic size of 0.1 inch and being expanded to a height of 0.3 inch and a corresponding width.

The third code character in the input stream is a vertical justification character. Justification as used herein is defined as the distance down the page that the printing of a printed element such as a number, letter, or symbol is started. This is not a vertical form control character, nor is it used to space between lines, but is used when elements of varying sizes are printed beside each other. The vertical justification is, like the printed element size, defined in terms of tenths of an inch. A zero justification indicates that the element is to be printed at the beginning of a pass, which is the basic printing unit and encompasses the vertical distance on the page which is required to accommodate the largest graphic element which is to be printed at that particular location.

With the print element size and the vertical placement thereof being given by the second and third characters of an input stream, the remaining information necessary for the printing of selected elements is the horizontal positioning. For horizontal placement, the leftmost parts of the first printed element for each row of printed characters are aligned as at a vertical margin. When the printer operates in the normal mode, means are provide for automatically spacing normally sized letters and numerals a normal space. Accordingly, in the print modification mode, enlargement of letters and numerals results in a corresponding enlargement of the normal space, equal to the character enlargement of the letter preceeding such space. If this automatically generated spacing is not desired, a horizontal tabbing function is provided by the present control system to allow positioning of characters at any incremental 0.1 inch vertical boundary.

From the foregoing, the control information sequence is seen to be:
1. A variable size coded input character;
2. A height of printing coded input character; and
3. A vertical justification coded input character.

These three control characters are followed in the input stream by four coded data characters which define the graphic elements which are to be printed at the specified size and location. To change the sizes of the printed elements on a single row of printing, another set of the three above described code characters must be inserted into the input information stream at the point where the new size is desired, so as to define in specific terms the new size and the location on the printed page of the elements to be printed.

Often the above-described automatically generated horizontal spacing between printed elements is not desired. Such would be the case if a word or letter is to be printed within a large letter, symbol, or other display, if a letter or number is to be located directly below another number or letter within a single pass, or if a group of letters is to be spaced in any arbitrary manner. In these cases, a "pointer", or vertical tabbing code may be inserted in the input stream of information signals. This pointer code would be followed immediately by an octal representation of the exact 0.1 inch horizontal location of the leftmost part of the element to be printed, relative to the leftmost printing column, to thereby horizontally locate the printing of the next printed character. The horizontal dimension from the leftmost column of printing can be any desired length to place the character at any desired horizontal location. For this purpose, the tabbing code, such as "018" octal, may be provided as a substitute first input code character in the incoming stream to indicate that the next defined printed element is to be located relative to the left margin in the horizontal direction. This effectively points the next letter to a selected horizontal dot position. Following this substitute input code, input data and control characters follow to complete the control sequence.

When the foregoing control and data code characters have been received in input buffer No. 1, the contents thereof are reformatted with the control code characters provided by the printer itself, the printer code characters being properly arrayed with said input code characters and moved into conversion buffer No. 2. This buffer No. 2 is in another section of RAM 34, and is indicated at 34B in FIG. 3. Here too, a separate memory may be provided, if needed. In conversion buffer No. 2, the original three control code characters are preserved. The "justify" character is negated and supplied with a negative value, which is used to simplify the coding required to start the printing of the graphic element specified by the particular data character at the desired location. Thus, the control system counts from the negative value toward zero, and the selected element is started on the print line at which the justify code changes to zero. A zero justify, though inverted to a negative value, will align the element to be printed in the first line of the first row of a pass. A minus 003 justify will count down the print rows to set the element to begin printing at the first lines of the row which is three tenths of an inch below the top of the pass.

In conversion buffer No. 2, the data retrieval routine is completed. The control system useable patterns for the various graphic elements such as alpha-numeric characters which are to be printed are stored in the pattern memory 29; the patterns for special printing items such as bar codes, lines, symbols and the like are stored in bar code memory 31. These patterns include all of the computer information necessary for the shaping of the individual graphic elements to be printed. Since the dot printer 13 prints a line at a time, the character to be printed is stored, accordingly, a line at a time.

Referring now to FIG. 4, there is illustrated at 50 a graphic element in the form of the letter "A", which may be printed in accordance with the print modification mode of the present invention. This letter is formed in an expanded 5×7 matrix, wherein the individual dot matrix of the basic letter size is replaced by an expanded matrix square, or control segment, such as that illustrated at 51. In the basic size configuration of the original printer, the control segment 51 might consist of a single dot; however, in the expanded format, where the letter size is expanded from 0.1 inch to 1.0 inch, the control segment 51 is ten times as large, and thus consists of a 10×10 matrix of dots arranged in horizontal lines and vertical columns. Thus, instead of requiring control information for printing a single dot, the print modification mode of the present invention now requires 100 pieces of information. The series of lines required to produce control segment 51 may be defined as a row, so that the expanded element 50 which still requires 7 rows of information, now requires 70 lines of information instead of the original 7 lines. In the particular illustration of FIG. 4, the control segment 51 is blank, and thus the quantity of information required to actually effect printing of that matrix is substantially reduced.

The next control segment 52 is expanded in the manner described with respect to segment 51, and in this case it may be seen that it contains a well defined changing pattern of printed dots, and it is this pattern which is obtained from the pattern memory 29 for storage in the pattern buffer 3 of FIG. 3, which is the random access memory 36. In similar manner, each of the 35 control segments which define the graphic element 50 have specific patterns of printed dots which may be selected from the pattern storage memory 29. Considering for the moment only the letter "A", the printer operates to produce this letter a single line at a time, starting at the top, which is the beginning of a "pass" and ending at the bottom of the completed letter, which defines the end of the pass. In carrying out this printing operation, 10 lines are printed for each control segment for a total of 70 lines for the completed letter. It will be seen by inspecting FIG. 4 that in the first line, the segment 51 prints no dots, segment 52 prints one dot, segment 53 prints all dots, segment 54 prints one dot, and segment 55 prints no dots. In order to obtain the desired slopes at the top of the letter, the pattern for control segment 52 and for control segment 54 each require that in the second line a single change be made; that is, that two dots be printed instead of just one. The remaining segments are unchanged. In the third line, again only a single dot is added to the printing in segment 52 and in segment 54, with the others unchanged. This sequence continues throughout the line-by-line printing of element 50, with the dot printer controllers 38 being set up for each line of print by the information contained in the pattern buffer 3 of FIG. 3.

Since the print modification controller of the present invention requires only the storing of changes of printing across a line, the information included per line need only be the locations at which changes occur. In order to utilize such patterns, then, it is necessary to know which row is being formatted and it is also necessary to know on which line of that row the changes occur. Accordingly, the controller supplies buffer No. 2 with a fifth and sixth control code character; one for current row, and the other for current line.

In cases where horizontal tabbing is utilized, in input buffer No. 1 a seventh input code character is provided for the letter or element to be printed which indicates that the horizontal tabbing routine is being utilized, and an eighth input code character is included to designate the horizontal position of the letter or element.

The information contained in conversion buffer No. 2 is operated upon by the microprocessor 24 to convert such information into a pattern and is passed through logic connector 46 to pattern buffer No. 3, which resides in RAM 36. The information in pattern buffer No. 3 defines which line is that in which a change occurs, as well as the vertical information already generated. In the pattern buffer No. 3 (36), all of the codes necessary for printing one row of each letter or other graphic element are stored in a left-to-right order representative of the finished printed line. Since, in the example of FIG. 4, a 5×7 matrix is utilized, the pattern buffer will contain five algorithm codes to represent the five patterns across the first row of the graphic element to be printed, which in this example is the letter A. The next algorithm code in left-to-right order in the pattern buffer 3 will be the horizontal spacing to the next character, this spacing having been supplied from memory or having been modified by horizontal tabbing.

The complete control information of conversion buffer No. 2 thus is decoded to the next level of usefulness by selecting pattern information from memory and inserting it into pattern buffer No. 3; thus, the contents of pattern buffer No. 3 are in algorithm code form and, at any one time, are for a single row of printing. The algorithm codes stored in pattern buffer No. 3 are instructions for printing selected lines or slices of a control segment. Referring again to FIG. 4, it will be noted that a second graphical element in the form of the letter "B" is produced on a much reduced scale. It should be noted, however, that this element is also produced in a 5×7 matrix, and it, too, may be divided into 35 matrix control segments, each of which has a specified pattern obtainable from the pattern memory 29 and which, when fed to the printer will result in the letter "B". In this case, however, the expansion from the normal size of printed element is from 0.1 inch to 0.3 inch, and accordingly the matrix control segments include fewer lines and columns, although still incorporating 7 rows. However, the 7 rows encompass only 21 lines in this case. To produce the element "B", however, the pattern buffer 3 must still contain 5 algorithms for each row, these algorithms being followed by a space algorithm or a further horizontal tabbing.

When a complete row is assembled within the pattern buffer No. 3, the microprocessor 24 decodes the algorithm codes therein and feeds them through logic connector 47 to a two state dot buffer, identified as buffer No. 4 in FIG. 3. This is a portion of the RAM 38 shown in FIG. 2. When the algorithms stored in pattern buffer 3 are decoded, the top line of the stored matrix is supplied to buffer No. 4 under the control of the current row and current line functions, both of which start at zero for each pass. Where, as in the case of the present illustrative embodiment, the printer includes 792 dot generators forming a print line, the two state dot buffer will have 792 positions to receive, in left-to-right order, information controlling the corresponding dot generators. Thus, 792 bits of information resulting from the decoding of the algorithms in pattern buffer 3 are supplied to dot buffer 4 and an entire line of print is now in buffer No. 4 in dot or space designating form. This information is transmitted through a logic connector 48 to the printer 13, where the entire line is printed simultaneously.

In order to supply the required information to buffer No. 4, each coded algorithm in buffer No. 3 must provide two items of information:

1. The current row on which the printer is operating, so that the system can account for the horizontal height of the element being printed. It is noted that the current row may vary from printed character-to-printed character across a page if different sized printed characters are used.
2. Current lines of dots within the row. Since the two state dot buffer No. 4 is the only buffer operating on an entire line at any one time, it is necessary to know what portion of each row is being fed to the printer.

Since the presently implemented dot printers are incapable of randomly accepting binary codes for producing dots, each dot that gets printed has to be sent to the printer for every line regardless of its status in the previous transmission to the printer. Although each calculation is essentially independent of the previous ones and the succeeding ones, in order for the controller of this invention to function, there must be a memory of the dot positions, of which the dot line is formed, and this memory must, at the beginning of each new dot line, contain the contents of the previous line, except for those changes required by the pattern algorithms. Thus, the dot buffer No. 4 preserves the dot and space designations from one line to the next, with the algorithm changing the pattern only where necessary.

When all of the control and data characters are formatted for a single pass, an end of pass code is included to indicate that the single pass is complete. Any subsequent control characters indicate that another single pass is to be formatted.

FIGS. 4 through 17D are actual copies of printing accomplished by this invention.

FIG. 4 illustrates the capability of the control circuit of the present invention to produce letters or other graphic elements in a variety of sizes, and further to place such letters wherever desired. All of the letters illustrated were printed in one pass of the printer, the paper moving incrementally past the line of dot printers in the conventional manner, without reversal. It is noteworthy to point out that the letters "E", "F", and "G" are placed under the letters "B", "C", and "D" without the necessity of running the paper through the printer two times, as was necessary in prior art systems. In order to accomplish such printing with the present controller, it is necessary to provide the host computer with only a limited amount of information, which is then fed to the controller as explained with respect to FIGS. 2 and 3. First, since the "A" is not printed at the normal size, a size change code is necessary. In the illustration, the particular size chosen is ten times the basic matrix size of 0.1 inch. Second, information as to how far the letter is to be lowered, or justified, below the top line of the pass, which is the distance between the top and bottom lines of a group of elements, must be provided. In this example, the letter "A" starts at the top of the pass and, therefore, its justification is zero. Finally, information must be provided concerning the letter to be printed; in this case, the fact that the letter "A" is to be printed. Each information item is supplied through a suitable computer or other source to the control circuit 11, by way of suitable codes. In one form of the invention an octal code may be used to designate the required bits of information.

In a working example of the invention, wherein the graphic elements of FIG. 4 were printed on a Printronix printer by means of the control circuit illustrated herein, the information fed to the control circuit was encoded as follows. First, the control character "020", was provided, this being an arbitrarily selected designation instructing the control system to convert from the normal mode to the print modification mode. Second, the control character "012" was provided. Since 012 is the octal designation for the decimal 10, this character instructed the control system to enlarge the graphic element by a factor of 10.

The third data character, the "justify" character, was "000", indicating no justification, so the designated graphic element was to start at the top of the pass. The fourth data character was "101", which in this embodiment was the octal code for the letter "A". These four characters, fed to the control system described above, are all that is required to select the letter "A", enlarge it 10 times, and, upon provision of suitable print instructions, cause it to be printed as shown.

One of the most important features of the invention, however, lies in the ability of the invention to cause the remaining elements of FIG. 4 to be printed. Continuing with the specific example discussed above, it is next seen that the graphic elements "B", "C" and "D" also require a size change, since they are larger than the base size of 0.1 inch. To signal the size change, the first code character for the next letters must also be "020"; however, the second control character will now be "003", designating a size of 0.3 inch. Since the "B", "C" and "D" are all located at the top of the pass, the justify character remains "000". The first three code characters are followed by octal "102"; "103"; and "104", the designations for the letters "B", "C" and "D", respectively.

It is to be noted that the space between the "A" and the "B" as well as the spaces between "B" and "C", and between "C" and "D" are all machine provided; i.e., are automatically supplied by the control system memory when the letters are designated, so that it is not necessary to specify normal spacing.

In the usual operation of the controller 11, the letters "E", "F", and "G" would next be designated by the incoming instruction, and such sequential designation would be expected to produce these letters in sequence to the right of the "D" letter. This could, of course, be done, and would result in a further mixing of letter sizes, a major feature of this invention. More importantly, however, the circuit of the present invention provides means for overriding the normal spacing of these successive letters, and permits the letters "E", "F" and "G" to be positioned under the letters "B", "C" and "D". This is done by means of the horizontal tabbing function discussed above, which, in this example, has been given the code of "022" octal. Insertion of code 022 octal in a stream of code characters acts as a pointer to relocate the graphic elements next following to a designated horizontal location. Thus, the input information needed for printing the last said letters requires only one further dimension: the horizontal distance in tenths of an inch from the left margin for the beginning of the letter "E".

In the illustration of FIG. 4, the location of "E" is measured from the left side of the letter "A", the distance being shown as 1.0 inch from the left margin to the place where the left side of the letter "E" is to be located. This makes the coding for the letters "E", "F" and "G" as follows:

Immediately following the code designations for the letters "B", "C" and "D", there follows the code octal "022", indicating a horizontal tabbing. The next code character specifies the distance in 0.1 inch increments; in this case octal 010, for 10 increments from the left margin. The code character "020" is inserted to indicate the print modification mode, and the size of the letters (0.4 inch) is indicated by the character 004 octal. Since these lettes do not begin at the top of the pass, a new justification code of 006 octal indicates that the first print line of the letters will be 0.6 inch below the top of the pass. The remaining octal code characters 105, 106, and 107 designate the printed characters "E", "F", and "G", respectively. Since this completes the instruction required to produce the graphic elements of FIG. 4, the terminator code, 015 octal in this example, is inserted to initiate the formatting procedures in the control circuitry and to start the print operation.

FIGS. 5 and 6 illustrate various sized printed elements and various placements of these elements with respect to each other, to indicate the variety of the printed material which can be produced by the present invention. In each case, letters or other printed symbols are positioned both horizontally and vertically on the page as desired to provide the desired graphical effect.

FIG. 7 illustrates the reverse printing capabilities of this control system. Reverse printing is accomplished by incorporating a selected code within the control stream. Thus, each time the reversal code is encountered, the places which would otherwise be dots will now become spaces, and the places that were spaces will become dots. Reversal codes may occur many times within a single print pass. In this example, the octal code 021 accomplishes the reversal of image. To return to normal black on white printing, a second 021 code must be inserted. However, any single pass begins automatically with black on white background.

FIG. 8 illustrates the versatility of this control system wherein mixed sizes of printed characters are presented on a single line by a single pass of the paper through the printer. This is accomplished as illustrated above by specifying the size and justification for each letter or other graphic element.

Figure 9:
FIGS. 9, 10, 11, 12, 13, and 14 illustrate some of the line drawing capabilities of this invention.
Figure 10:
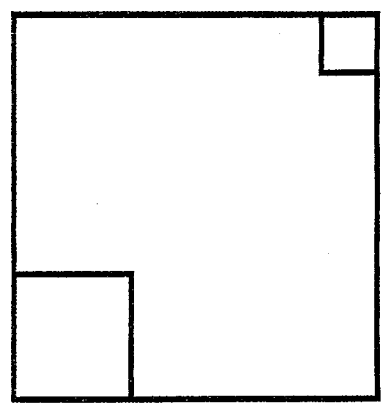

FIGS. 9 through 16 illustrate the line-drawing capabilities of this controller. FIG. 9 illustrates that the printer can produce a line from one dot thickness on up to any desired number of lines of dots. It further shows that these lines can be printed in pairs, triples, etc., and with any variations of length or thickness within such combinations. Obviously, the number of parallel lines can be any number desired by the user. FIG. 10 similarly shows additional designs of line combinations that are available in this invention.

Figure 11:
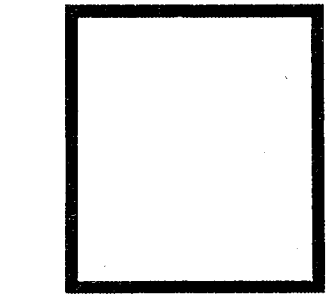
Figure 12:

FIG. 11 shows a unique line drawing wherein an enclosure is defined by a pair of parallel bordering lines, wherein the inner borders are extended to the outer borders at the corners. The provision of the vertical and horizontal intersecting lines requires for this graphical design is a unique function of the present invention. FIG. 12 additionally shows a bar code presentation within a line boundary. The bar code memory of the present invention allows selection of code representations of matrix segments which will print verticalor horizontal product bar codes for use in producing labels. These bar codes are selected in the same manner as the alphabetical elements discussed above, and are similarly encoded for location where desired on a page.

Figure 13:
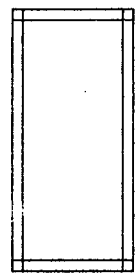
Figure 14:
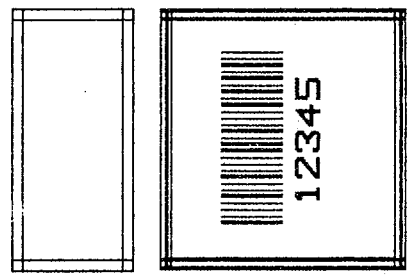

FIG. 13 illustrates a heavy black border generated by this invention, while FIG. 14 illustrates the production of graphic displays located within other displays. FIG. 15 demonstrates the presentation of a graph with accompanying legends through the use of the unique control system of this invention.

FIG. 16 shows a label with border lines and sectional lines provided by this invention along with alphabetical and numerical elements, different printing sizes, and flexible location of any of the symbols thereon. The entire label, including bordering and all the characters therein, was printed at high speed in one pass of the paper through the printer under the control of the circuit or the invention. Such labels may be printed repetitively in large numbers, or singly for special purposes, as desired.

FIGS. 17A, B, C, and D are a portion of an entire page of labels which were printed in one pass through the printer. This portion illustrates the vertical duplication of labels and the horizontal variation of such first set of labels. Included in each label is reverse printing, numbers within other printing, product identification in alpha-numeric characters, and bar codes, all done within a single pass of the paper through the printer.

Figure 18A:
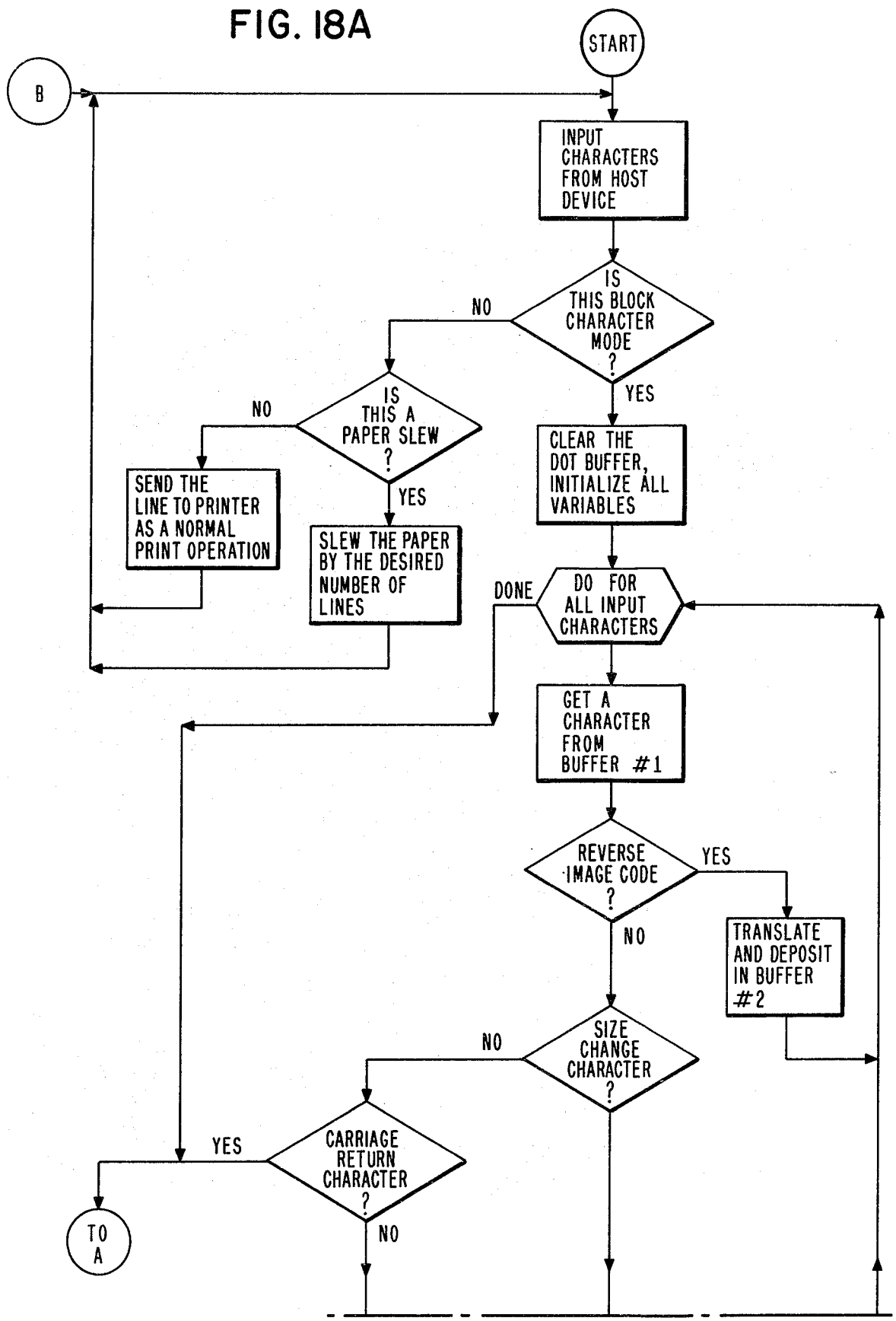
Figure 18B:
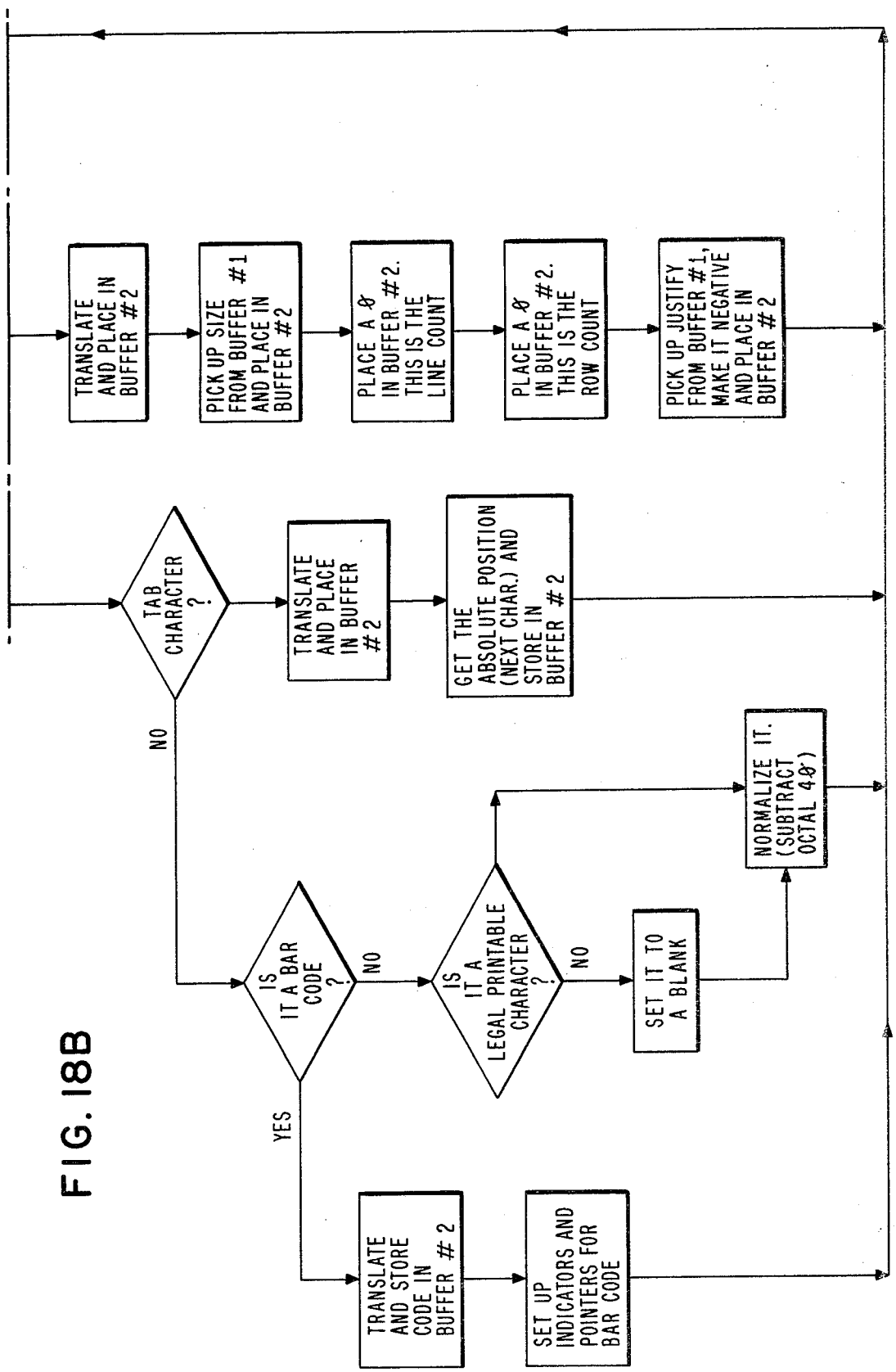

The logic flow chart, which starts in FIG. 18A, shows how the several functions of this controller may be accomplished in a specific form of the invention, and illustrates the data and control information flow within the illustrated circuit arrangement. First, the data stream is brought in from the host computer. This comes in at START. The mode of operation is selected, the dot buffer No. 4 is cleared of all bits, and all other variables are initialized. Next, a loop is presented which sets up conversion buffer No. 2 by operation of the contents of input buffer No. 1. This operation is principally in FIG. 18B.

Figure 19A:
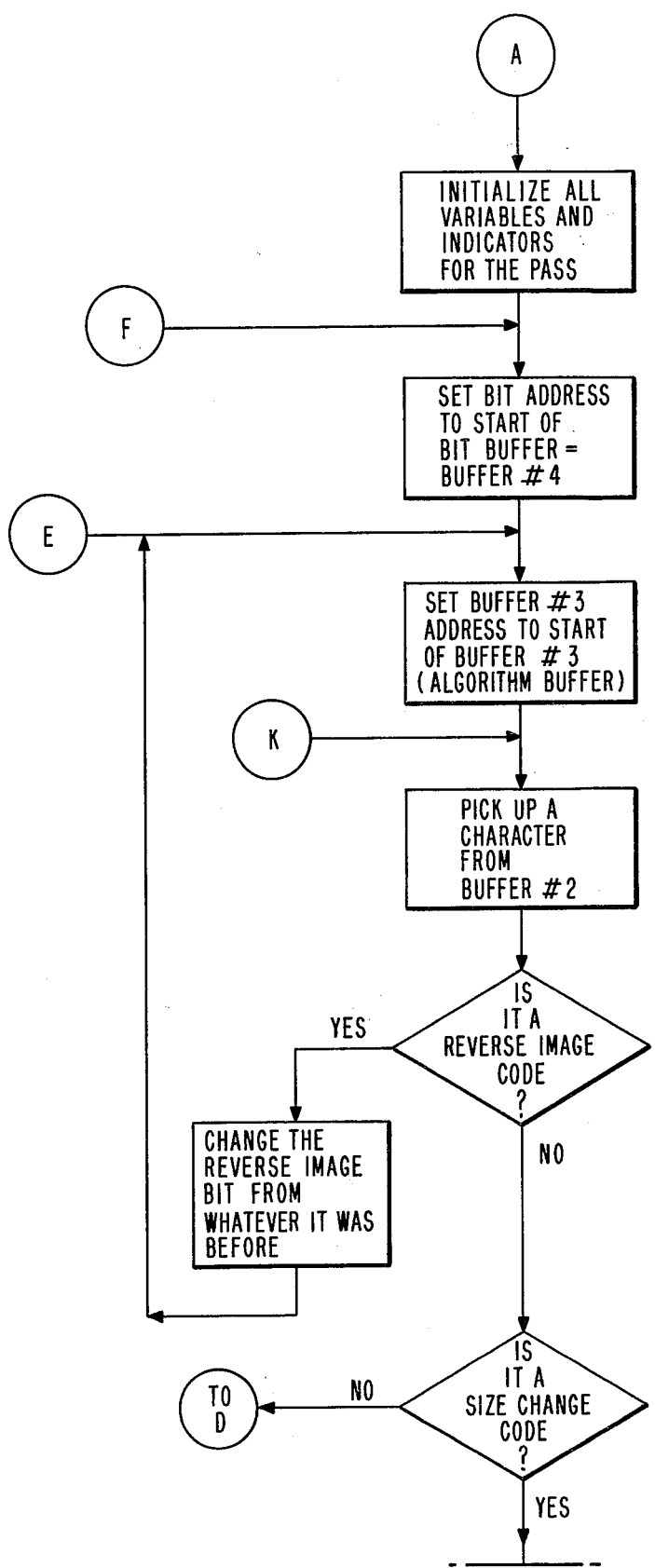
Figure 19B:
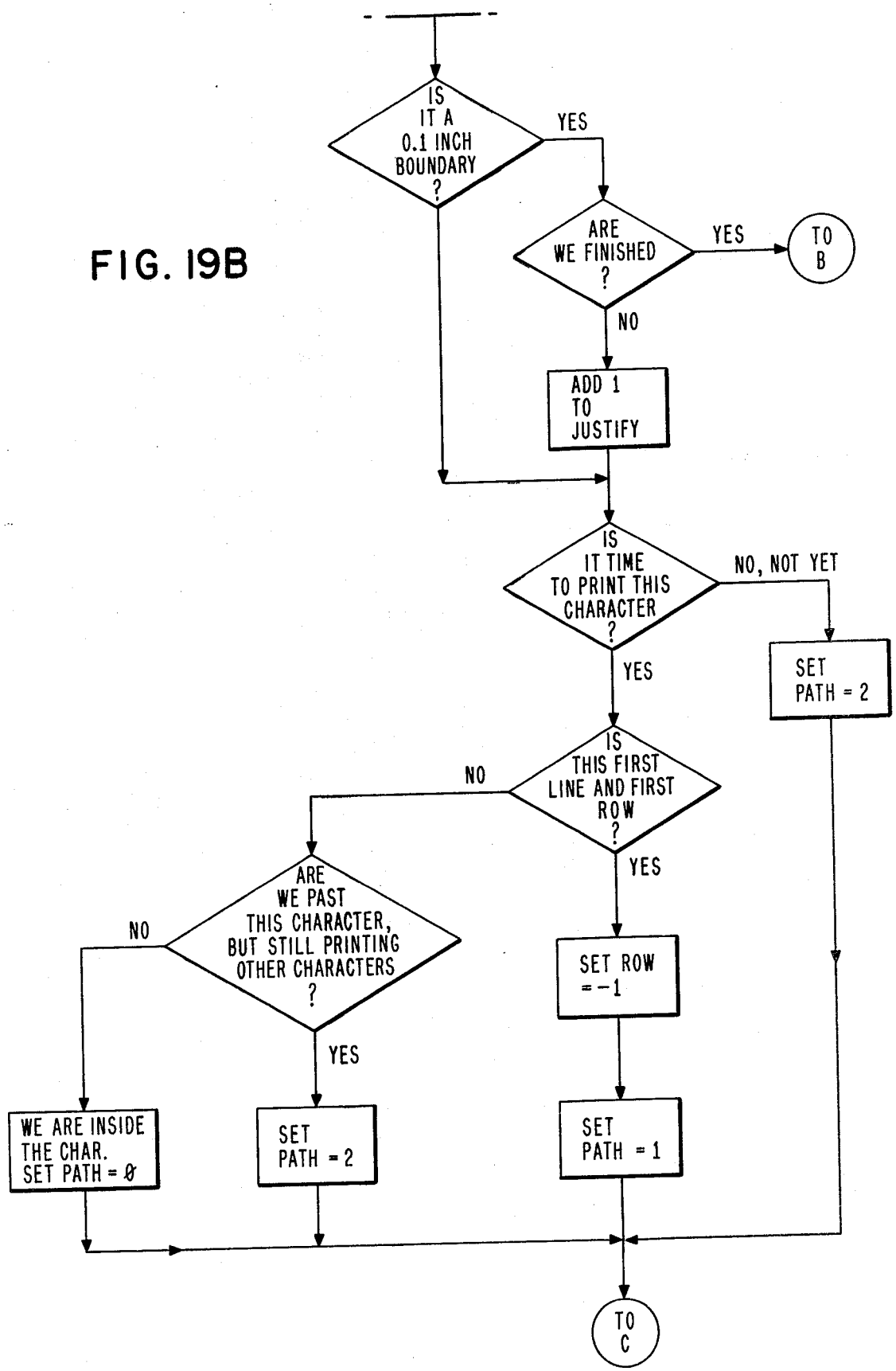

FIGS. 19A and B show the setting of addresses in buffers No. 3 and No. 4 and the beginning of the generation of the contents of buffer No. 3, utilizing the formatted contents of conversion buffer No. 2.

Figure 22C:
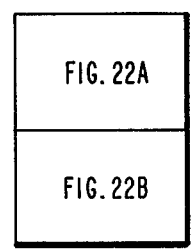
Figure 20:
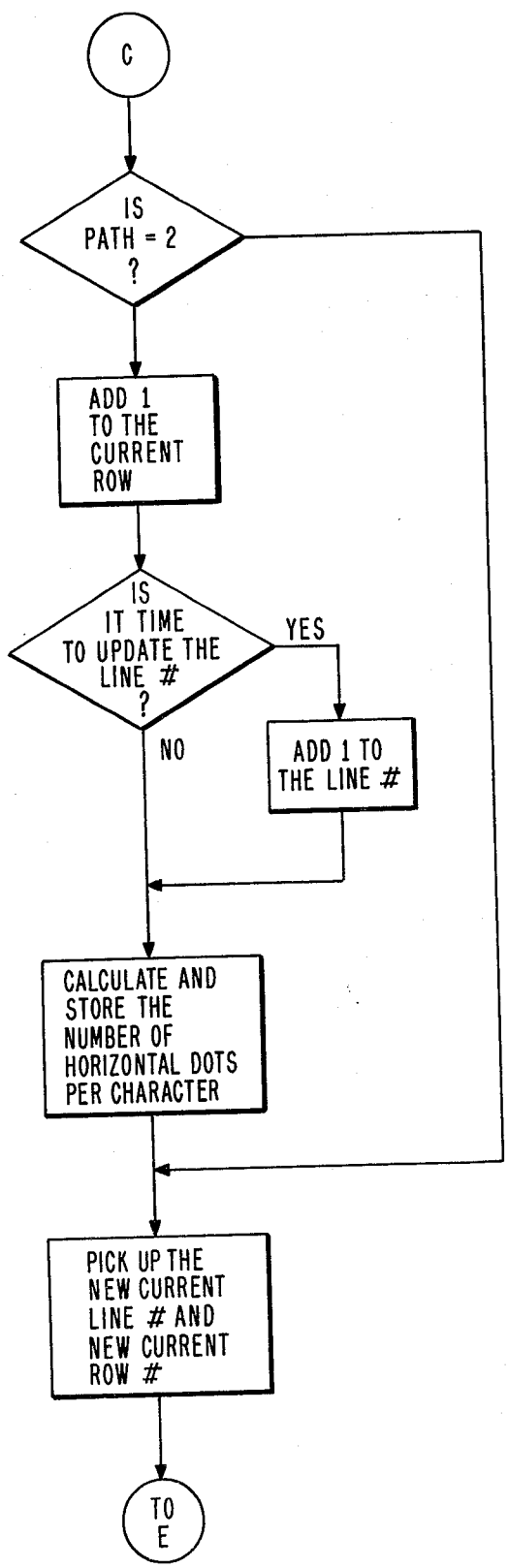
Figure 21:
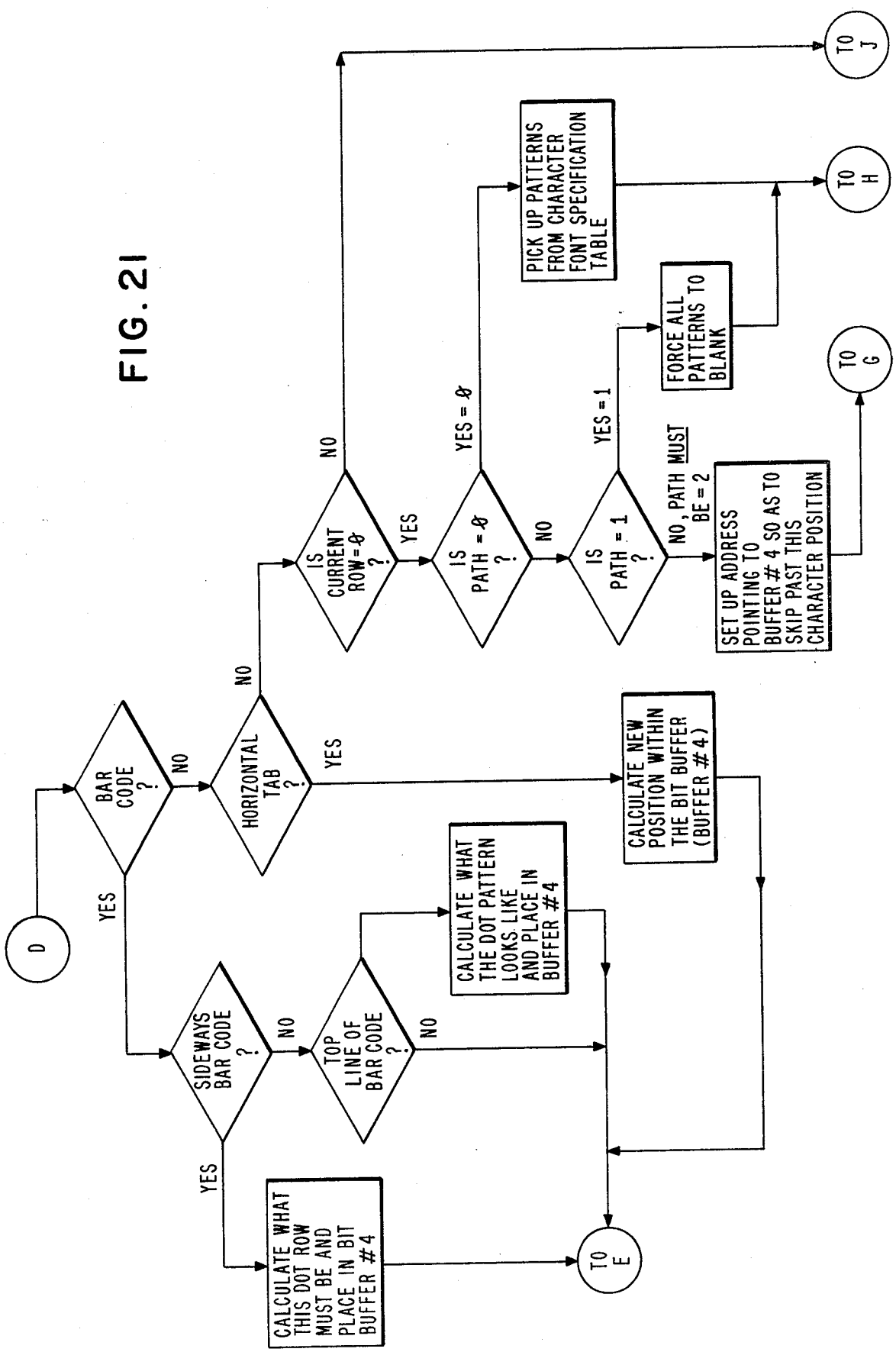
Figure 22A:
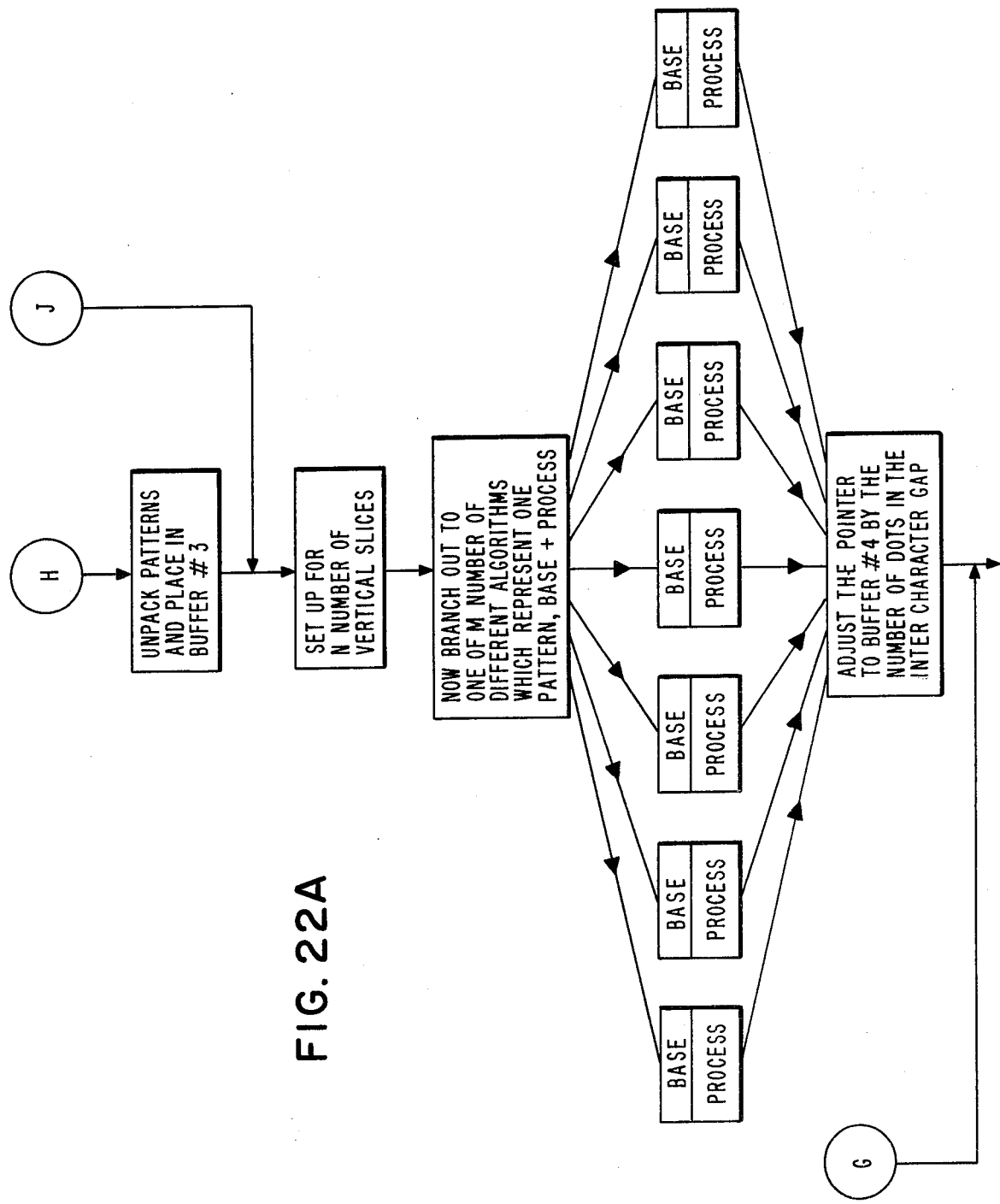

FIG. 20 continues the preparation of the contents of pattern buffer No. 3, while FIGS. 21 and 22A present the steps in setting up the contents of dot buffer No. 4. This illustrates the way in which the algorithms are utilized to process a single print line from left-to-right across the page. In FIG. 22B, the dot row is completed, sent to the printer from buffer No. 4, and the program is returned to F on FIG. 19A to initiate processing of the next print line. FIG. 23 illustrates a typical algorithm to fill the left side of a page with white (no printing) and to fill the right side of that page with black (full printing).

The various features and functions of the invention which have been described hereinabove with respect to the block diagrams of FIGS. 2 and 3 and the flow chart of FIGS. 18–23 have been carried out in a specific embodiment of the invention which has been tested and found to operate in the manner disclosed. The microprocessing unit functions to receive and store incoming coded control signals and operates in response to those control signals to withdraw the required pattern information from pre-stored memory locations. The selected pattern information is temporarily stored in a suitable buffer memory location and the microprocessing unit operates to withdraw printer control information on a line-by-line basis from the buffer memory, converting it to a form which may be used to control the operation of the dot forming elements of the printer.

A specific form of the control circuit of the present invention is set forth in Appendix A, which shows in detail the various circuit elements, their specific interconnection with each other and with the interface to the data source and the interface with the printer, and discloses in detail the specific circuit elements used in the system.

It should also be noted that the information relating to the pattern shapes of the graphic elements to be printed, which information is contained in the pattern memory 29 (FIG. 2) is similar in nature to the pattern information utilized in U.S. Pat. No. 3,893,100 to Charles W. Stein. This patent illustrates in greater detail the manner in which a printed graphic element matrix is formed from a plurality of dot lines which make up rows or segments and which may be assembled to produce the desired graphic element.

Thus, there has been disclosed a new and unique control system for dot printers which permit the printing of symbols, letters, numbers, and other graphic elements in desired sizes and at selected locations, permitting variations in both size and location on an element-by-element basis and permitting many unique combinations which result in attractive and highly useful printed documents. To accomplish such printing, the control system of the invention operates to bring in to the system a stream of control and data characters from a source such as a host computer, which characters serve to direct the operation of the system. Stored internally within the control circuitry are pattern instructions for the various graphic elements that are to be produced by the system with the control circuitry of the invention responding to the input stream of control and data characters to select and store in a temporary memory those patterns which are required to create the desired print out patterns. These patterns are modified by the system so that the resultant print out will be of a desired size, and horizontal tabbing and vertical justification values are provided to insure that the graphical elements will be printed at selected locations on the page. When the desired pattern modifications have been completed, the patterns required for the top line of the graphic elements grouping, or pass, are fed to an output buffer. This top line of pattern information is sent to the printer, which then produces dots and spaces in accordance therewith. The next line of pattern information is then selected, a determination is made as to which dots must change in order to create the second line of the pattern on the print out, and this second line of information is sent to the printer. These steps are repeated until the section of the graphic element contained in the storage is completed, and thereafter the process repeats until the entire element, or the entire pass has been completed. The paper is then slewed to the location of the next pass, and the process repeats.

Although the present invention has been described in terms of preferred embodiments thereof, it will be apparent that numerous variations and modifications can be made without departing from the true spirit and scope of the invention as defined in the following claims.

I claim:

1. A controller for operating a line-by-line dot printer in a print modification mode, wherein graphical elements are individually selected, individually sized and individually positioned at specified line and column location on a printed display so that elements of different shapes and sizes can be intermixed and displayed in a single pass of the printer, comprising:

input buffer means for receiving and storing coded print modification mode instruction data specifying graphic elements to be printed by the line-by-line dot printer and including means specifying the relative size and relative location on the printed display of each of said specified graphic elements, said modification mode instruction data being incapable of directly controlling the printer;

a first pattern memory, said memory storing possible graphic element patterns in segmental row and column matrix form, the pattern for each segment including line-by-line dot pattern information, each pattern being expansible to provide a graphic element segment having a number of lines which depends upon and corresponds to the size of the graphic element specified by said invention data, the number of segments in a graphic element matrix remaining constant;

conversion buffer means connected to said input buffer means;

first control means for modifying and transferring said instruction data to said conversion buffer means, said control means including means for interleaving control data with said instruction data, whereby said conversion buffer means includes means providing a pattern address for each of said graphic elements specified by said instruction data means providing pattern row and line control counts for each graphic element and means providing a size identifier and a justification count for each specified graphic element;

a second pattern memory for temporarily storing graphic element patterns selected from said first pattern memory;

second control means for scanning said conversion buffer means for each dot line to be printed to call up from said first pattern memory and to store in said second pattern memory graphic element segment patterns for any graphic element which has segments corresponding to the line to be printed, as determined by its justification count means and by its pattern row and line count means;

an output dot memory buffer;

third control means for scanning said second pattern memory and transferring to said dot memory buffer the dot patterns for the single line of each graphic element pattern specified by said line control count means of said conversion buffer;

means for transferring the single line contents of said dot memory buffer out of said controller to set up the dot printer for printing a single line of dots;

said second control means repetitively scanning said conversion buffer to advance said justification and said pattern row and line count means and to sequentially transfer to said dot memory buffer the dot patterns for each line in each segment pattern and for calling up from said first pattern memory the pattern for the next graphic element segment upon completion of a preceding segment.

2. The controller of claim 1 in which said output dot memory buffer retains said single line dot pattern information, said third control means modifying said single line where needed for the next print line.

3. The controller of claim 1, and further including means to reverse the code state of the contents of said output buffer to produce reverse printing.

4. The controller as defined by claim 3, further including means to again reverse the contents of said output buffer to restore normal black-on-white printing.

5. The controller of claim 1 wherein a zero justify count causes all of the tops of the printed graphic elements to be aligned.

6. The controller of claim 1 further including column location means in said conversion buffer for providing selected horizontal tabbing, said column location means and said justification count means cooperate to locate one predetermined printed graphic element within the boundaries of another predetermined graphic element.

7. The controller of claim 1, wherein groups of printed graphic elements sharing common printed lines constitute a pass, said control means further including:

means for printing a plurality of passes, and means for introducing a slew of selectable distance between successive passes.

8. A control circuit for operating a line-by-line dot printer in a print modification mode wherein individual graphic elements of selectable size are created and wherein each graphic element is individually located on a printout page so that elements of different shapes and sizes can be intermixed and positioned at selectable row and column locations on the page, and wherein said graphical elements are printed line-by-line in a single pass of the page through the dot printer, comprising:

first buffer means for specifying graphic elements to be printed, said input buffer including for each graphic element first means for determining its size, second means for determining its column location, and third means for determining its row location;

conversion buffer means connected to said first buffer means;

means for transferring the contents of said first buffer means to said conversion buffer means and for supplying for each said graphic element current row counting means and current line counting means;

a pattern storage table, containing pattern instructions for a plurality of graphic elements, each said element being divided into a preselected number of matrix segments, each segment defining at least a single dot line and a single dot column to create a printed graphic element of the smallest size, each pattern instruction being capable of creating a graphic element of a selected larger size by providing instructions for a plurality of dot lines and dot columns in each matrix segment of said graphic element;

a pattern storage buffer connected to said conversion buffer means and to said pattern storage table;

means responsive to said conversion buffer means for transferring pattern instructions for designated graphic elements from said pattern table to said pattern memory, said size determining means establishing the pattern size for each designated graphic element;

dot buffer means connected to said pattern memory; and means responsive to said row location means, said current row counting means and said current line counting means for transferring a single line at a time, the dot pattern instructions in said pattern storage buffer to said dot buffer means for controlling the dot printer.

9. A method for constructing on a page a graphical display including a plurality of graphic elements and for individually selecting the size and location of each graphic element so that elements of various sizes and shapes can be intermixed, said graphic elements being printed on a page line-by-line in a single pass of the page through a dot printer, the method comprising:

storing dot pattern information for a multiplicity of graphic elements, said pattern information being stored in row and column segmented matrix form, the pattern information for each matrix segment being expandable to create graphic elements of selectable size;

determining specific individual graphic element shapes to be displayed;

determining the size of each graphic element to be displayed;

determining the horizontal and vertical location on a page of each graphic element to be displayed;

selecting first row segments of stored dot pattern information corresponding to specific graphic elements to be displayed on a first row of said page and temporarily storing the selected dot pattern information;

scanning the selected dot pattern information on a line-by-line basis, each line scan obtaining a single line of dot information; and storing each single line of dot information in turn in a single line dot buffer for use in controlling a dot printer, each line of dot information modifying the prior line of dot information modifying the prior line of dot information in said single line dot buffer to create the current line of dot information to be printed, whereby the line dot information fed to said dot buffer is limited to dot change information.

10. The method of claim 9, further including the step of selectively inverting stored pattern information to produce reverse image printing.

11. The method of claim 10, further including repeating the step of inverting selected pattern information to return the reverse image printing to normal.

12. The method of claim 9, further including repetitively scanning the selected dot pattern information to produce a row of dots corresponding to the selected graphic element segment, the number of scans, and thus the number of lines in said row of dots, being dependent on the determined size of the selected graphic element.

13. The method of claim 12, further including selecting a second row of segments of stored dot pattern information for each specific graphic element to be displayed upon completion of the first segment row for that element, repetitively scanning the selected dot pattern information, and selecting subsequent segment rows until completion of the graphic element.

14. The method of claim 13, wherein the selection and repetitive scanning of each graphic element is independent of other elements, whereby graphic elements of differing sizes and shapes can be selected and displayed on a line-by-line basis by a dot line printer.

15. The method of claim 14, further including counting the row and line being scanned for each element; and
determining from the current row and line count when a next pattern segment is to be selected.

16. The method of claim 15, further including providing justification counts for said graphic elements to specify the vertical location of each graphic element; and
determining from said justification counts which graphical element patterns are to be selected for each print row.

17. The method of claim 16, wherein a zero justification count causes the tops of individual graphic elements to be in horizontal alignment.

18. The method of claim 16, further including providing horizontal tabbing for said graphic elements to specify the horizontal location of a graphic element, wherein a zero horizontal tabbing causes an individual graphic element to be aligned with the margin of the page.

19. The method of claim 18, wherein those graphic elements which are not modified by horizontal tabbing are automatically spaced horizontally from the immediately preceding graphic element by an amount determined by the stored pattern information.

20. The method of claim 19, further including selecting the horizontal tabbing, vertical justification, and size changes for the pattern information of a first graphic element so as to locate said first graphic element within the boundaries of a second graphic element.

21. The method of claim 19, further including selecting the size changes and vertical justification for said graphic element patterns so as to produce mixed sizes in the printed graphic element patterns.

22. A method for constructing on a page a plurality of graphical display elements, said elements being printed line-by-line by a dot printer having a single line of dot print elements extending the width of the page to be printed, comprising:
providing data representing graphic elements to be printed on a page, said data specifying said elements in any sequence but identifying the horizontal and vertical location on a page of each element, said data being in a form not usable by the dot printer;
transforming said data to usable form to provide for each graphical element,
(a) a size indicator to establish the relative size of the elements,
(b) a justification indicator to establish the relative vertical location of the element,
(c) a current row identifier,
(d) a current line identifier, and
(e) a pattern address for the graphical element;
providing stored pattern for a multiplicity of graphic elements, each graphic element pattern being in row and column matrix form having a predetermined number of pattern segments, each section being formed by a variable selectable number of dot lines, the number of dot lines selected for the segments of a pattern determining the size of the graphic element produced by that pattern;
repetitively scanning said transformed data to determine which graphic elements are to be printed on each print line;
selecting from pattern storage the pattern for each graphic element to be printed;
transferring the selected patterns to a pattern memory;
scanning said pattern memory and transferring from said selected patterns to a dot buffer dot print data for a single line of dots to be printed in a form usable by a dot printer, said dots being located in said single line in accordance with the selected patterns to enable a dot printer to print the single line of dots;
repetitively scanning said pattern memory to sequentially transfer to said dot buffer each line of the selected patterns; and
repetitively scanning said transformed data to select new patterns when required, whereby the desired graphic elements are constructed line-by-line on said page.

23. The method of claim 22, wherein the number of dot lines selected for the segments of a pattern are determined by said size indicator.

24. The method of claim 22, wherein the selection of patterns is determined in accordance with the pattern address, justification indicator, current row identifier and current line identifier for the graphic element to be printed.

* * * * *